United States Patent [19]

Nelle

[11] 4,170,829
[45] Oct. 16, 1979

[54] CORRECTION APPARATUS FOR LONGITUDINAL OR ANGULAR MEASURING SYSTEM

[75] Inventor: Gunther Nelle, Bergen, Fed. Rep. of Germany

[73] Assignee: Dr. Johannes Heidenhain GmbH, Traunreut, Fed. Rep. of Germany

[21] Appl. No.: 928,909

[22] Filed: Jul. 28, 1978

[30] Foreign Application Priority Data

Aug. 4, 1977 [DE] Fed. Rep. of Germany ....... 2735154

[51] Int. Cl.² .............................................. G01B 11/04
[52] U.S. Cl. ................................ 33/125 R; 33/125 C
[58] Field of Search ................. 33/1 L, 125 R, 125 C, 33/125 A, 125 T; 356/373, 374; 250/237 G

[56] References Cited

U.S. PATENT DOCUMENTS

| 2,988,681 | 6/1961 | Bower | 318/28 |
| 4,060,903 | 12/1977 | Ernst | 33/125 R |

FOREIGN PATENT DOCUMENTS

| 1231595 | 12/1960 | Fed. Rep. of Germany . |
| 1552273 | 3/1970 | Fed. Rep. of Germany . |
| 1477390 | 5/1971 | Fed. Rep. of Germany . |
| 2042505 | 3/1972 | Fed. Rep. of Germany . |
| 455303 | 6/1968 | Switzerland . |

Primary Examiner—Harry N. Haroian
Attorney, Agent, or Firm—Hume, Clement, Brinks, Willian & Olds, Ltd.

[57] ABSTRACT

An apparatus for compensating for errors in a longitudinal or angular measuring device includes one or more adjustment members arranged to contact the measuring scale of the measuring device and to deflect the scale out of the graduation plane. The deflection of the scale is used to alter the indicated position as measured by the measuring device in order to accomplish the desired correction.

12 Claims, 7 Drawing Figures

U.S. Patent    Oct. 16, 1979    Sheet 1 of 2    4,170,829
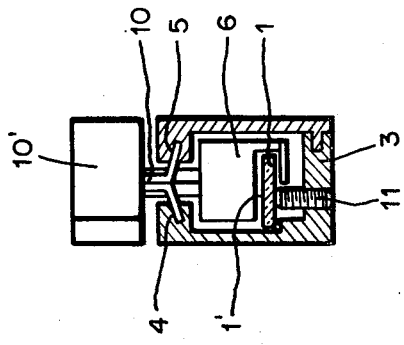
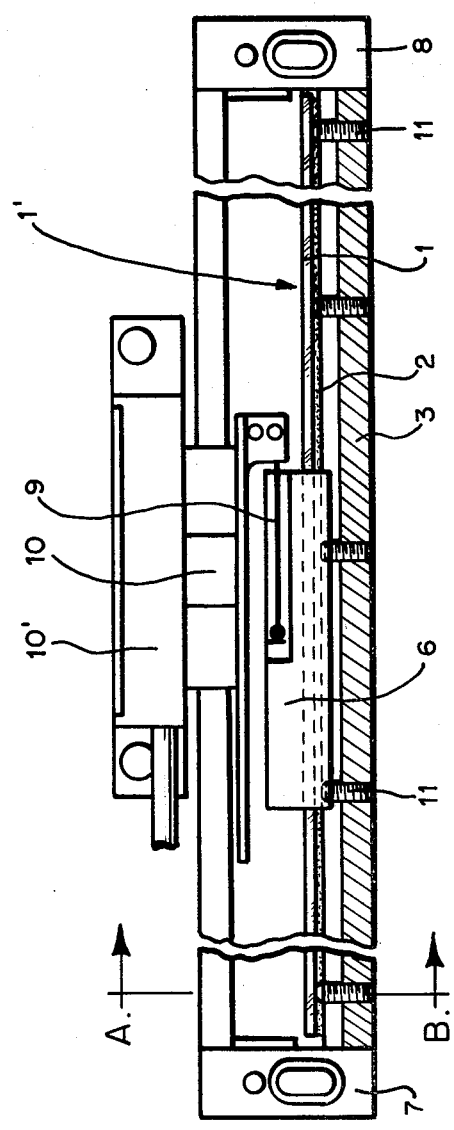
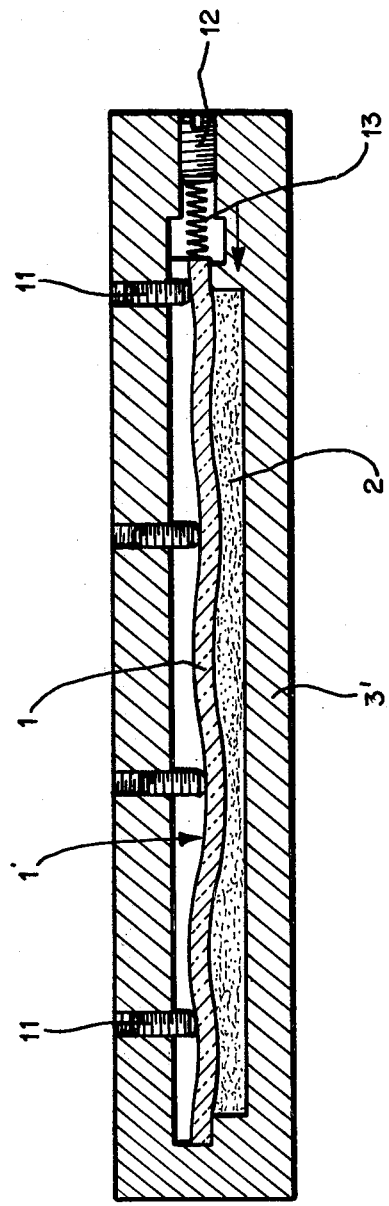

Section Along C-D

Section Along E-F

CORRECTION APPARATUS FOR LONGITUDINAL OR ANGULAR MEASURING SYSTEM

BACKGROUND OF THE INVENTION

This invention relates to longitudinal and angular measuring systems which include a scanning unit movable along a measuring scale for measuring the relative position of two objects. More particularly, this invention relates to an improved error correction apparatus for such systems which is particularly suited for the correction of guiding errors of the two objects. In practice, the two objects may be the bed and carriage of a machine tool or a measuring device, for example.

Errors in processing or measuring machines, particularly errors in the guides, may cause measurement errors. That is, the indicated position as measured by the measuring system may differ from the actual position of the processing or measuring machine by an unacceptable amount. In some cases the indicated position may be consistently greater or less than the actual position. In other cases, the indicated position may range from a value greater than the actual position in some portions of the measurement range to less than the actual position in other portions. The production of highly accurate guide means is difficult and expensive, particularly in the case of large machines. Moreover, wear in the guide means may in time increase the guiding error beyond the admissible tolerances. Various corrective systems have been proposed in the past to compensate or reduce such errors.

For example, in column 1 of the German Auslegeschrift No. 1,477,390, an apparatus is described for compensating guiding errors by regularly sensing these errors in order to exert counter-forces upon the guide means of the machine via an adjustment system. Such compensation systems are generally costly and expensive.

German Offenlegungsschrift No. 2,042,505 discloses an apparatus which uses a correction ruler for error compensation. The correction ruler is scanned via a lever system which readjusts the position of the scanning unit to carry out the desired correction. In many cases correction rulers are difficult and expensive to produce. Moreover, the correction ruler must generally be replaced in time as the error changes with wear. Adjustable correction rulers as shown in German Auslegeschrift No. 1,231,595 are generally expensive as to their design.

In another known compensation method cams are set at certain points along the measuring path where a correction is to be accomplished, and as these cams are traveled over they release a correction signal (German Auslegeschrift No. 1,552,273). The application of corrective cams is also expensive, particularly with large machines.

Yet another error correction method is shown in U.S. Pat. No. 2,988,681, where errors in the mechanics of machines are corrected with the aid of a "correction computer". Several influential factors which relate to measurement errors are stored in the computer, so that an associated correction signal can be used to correct the measured position by an amount which varies with the prevailing position of the measuring system.

A relatively simple correction apparatus is disclosed in the German Offenlegungsschrift No. 2,518,745. There the longitudinal measuring scale is corrected by longitudinal compression or longitudinal stretching to compensate for errors such as machine guiding errors, and thus the indicated position is corrected. One drawback of this method is that it permits compensation of only linear errors.

SUMMARY OF THE INVENTION

The present invention is directed to a particularly simple apparatus for accurately and reliably compensating both linear and non-linear errors in longitudinal and angular measuring systems. According to this invention, the measuring scale of the measuring system is deflected slightly in at least one location in a direction substantially perpendicular to the plane of the scale in order to compensate for errors.

At least one adjustment member, preferably an adjustment screw, is provided for the deflection of the measuring scale. Preferably the scale is mounted in a support member and the adjustment members are mounted in the support member to contact the scale.

A preferred embodiment of the invention provides for the combination of two error compensation systems. In the first system, the scale is longitudinally stretched or longitudinally compressed, depending on the nature of the error, to compensate for linear errors. The second system deflects at several points the longitudinal measuring scale in a direction substantially perpendicular to the graduation plane for the compensation of non-linear errors. The correction of the longitudinal measuring scale may be accomplished either prior to the mounting of the measuring system directly at the machine after assembly.

Additional characteristics of the invention are recited in the dependent claims.

In the simplest case the compensation method, according to this invention, requires only adjustment screws to effect the desired correction. These adjustment screws may be mounted in the supporting body for the measuring scale. Thus, the invention utilizes particularly simple means to compensate for even non-linear errors of the machine or the measuring scale. This invention permits a reduction in manufacturing costs for the machine, because greater tolerances are admissible in the production of the individual machine parts. The useful lifetime of the machine also can be extended. In fact, the method of compensation of this invention even permits repeated correction of the measuring scale simply and without additional construction costs.

The invention itself, together with further objects and attendant advantages, will be best understood by reference to the following description taken in connection with the accompanying drawings.

BRIEF DESCRIPTION OF THE DRAWINGS

FIG. 1 is a sectional view of an encapsulated longitudinal measuring system including a first preferred embodiment of the error correction apparatus of this invention.

FIG. 2 is a sectional view taken along line A-B of FIG. 1.

FIG. 3 is a sectional view of a second preferred embodiment of the invention.

DETAILED DESCRIPTION OF PREFERRED EMBODIMENTS

Figure 5:
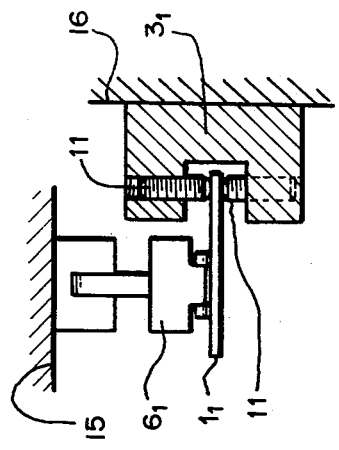
FIG. 5 is a sectional view taken long line C-D of FIG. 4.
Figure 7:
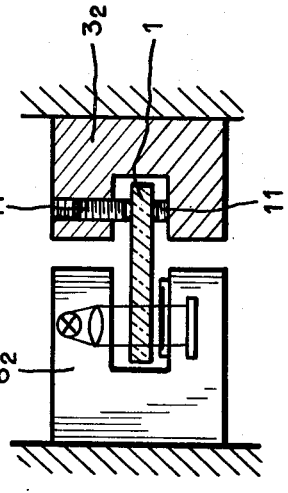
FIG. 7 is a sectional view taken along line E-F of FIG. 6.

Refering now to the drawings, reference numeral 1 in FIGS. 1 and 2 identifies the measuring scale of an incremental measuring system for longitudinal measurements. A grid graduation on the measuring scale is placed at the surface 1". The scale 1 is fastened by means of a highly elastic layer 2 such as silicon rubber at the protruding part of a U-shaped housing 3. Roof-shaped sealing lips 4 and 5 of flexible material protect the scale 1 and a scanning unit 6 from disturbing environmental influences. In this embodiment the measuring scale 1 is a glass rod, and the housing 3 is preferably formed from an extruded aluminum profile. The housing 3 is fastened via fastening members 7 and 8 to an object, for example, a machine bed (not shown). The scanning unit 6 is connected via a coupling member 9 placed outside the neutral plane of the measuring scale 1, to a blade-like entrainment means 10 which extends out of the housing 3 between the sealing lips 4 and 5 and whose outer component 10' is fastened to a second object, for example, a machine carriage (not shown). Encapsulated digital longitudinal measuring systems of the above described kind are known from prior art, for example, from German Offenlegungsschrift No. 2,505,587.

In this preferred embodiment of the invention, adjustment screws 11 are arranged in the housing 3 and are adjustable from the outside of the housing. These screws 11 are provided for the compensation of measurement errors, particularly guiding errors of the objects on which the measuring system is mounted. With the aid of the adjustment screws 11 the measuring scale 1 is deflected slightly at several points perpendicularly to the plane of the scale 1 to compensate for measurement errors such as guiding errors and/or errors in the measuring scale. Thereby, commensurate with the expansions and compressions of the marginal zones of the scale 1, its graduation becomes longer and/or shorter.

One method of determining error values of the machine and/or the measuring graduation is by use of a laser interferometer. The error values are determined by comparing the indicated position of the measuring system to be examined with the laser interferometer. Assuming the errors of the interferometer to be negligibly small, the difference between the two readings corresponds to the error to be corrected. The deflection of the measuring scale 1 perpendicular to the graduation plane is then adjusted appropriately for the machine at which the measuring system is installed to compensate for the measured error. It also is possible to correct the measuring scale for anticipated errors by means of an error log prior to mounting it on the machine.

In FIG. 3 forces are exerted on the measuring scale 1 via the adjustment members 11 in the direction toward the supporting surface for the measuring scale 1. These forces cause a deflection perpendicular to the graduation plane. Moreover, with the aid of an adjustment screw 12 a compression that is a linear shortening of the graduation of the scale 1 takes place via a spring 13. Thus, both linear and non-linear errors may be compensated.

Figure 4:
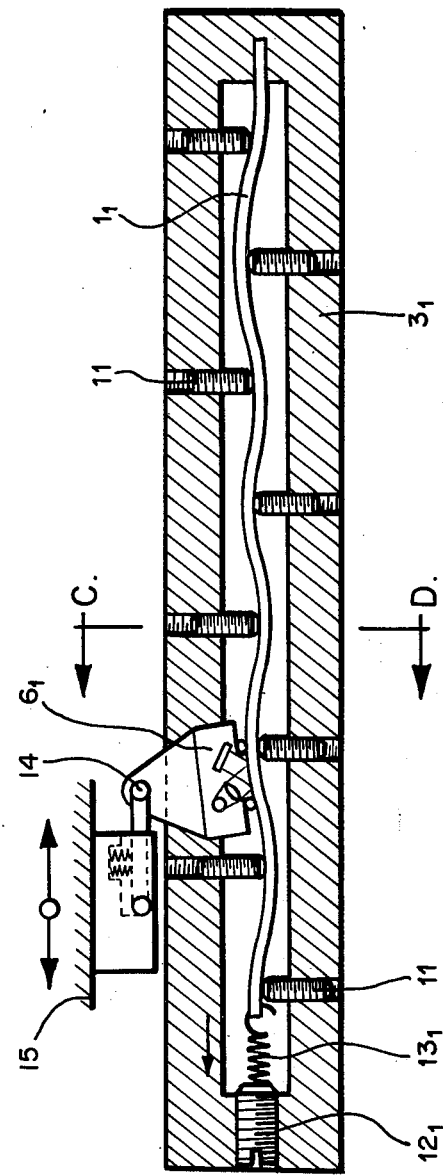
FIG. 4 is a sectional view of a third preferred embodiment of the invention including a longitudinal measuring installation having a flexible measuring scale.

FIG. 4 shows a digital electrical longitudinal measuring device having a flexible measuring scale $1_1$, which is preferably a steel tape. The flexible measuring scale $1_1$ may be expanded or stretched with the aid of the screw $12_1$ and the traction spring $13_1$. The linear expansion and thus elongation of the measuring scale $1_1$ is proportional to the spring force of the traction spring $13_1$. The scanning unit $6_1$ is guided on the measuring scale $1_1$. The flexible measuring scale $1_1$ is deformed by screws 11 in a direction substantially perpendicular to the graduation plane commensurate with the error values. This correction is a function of the distance between measuring scale $1_1$ and coupling joint 14 of the scanning unit $6_1$ and the sagging of the measuring graduation $1_1$. Reference numerals 15 and 16 identify a surface of a machine carriage and a surface of a machine bed, respectively.

Figure 6:
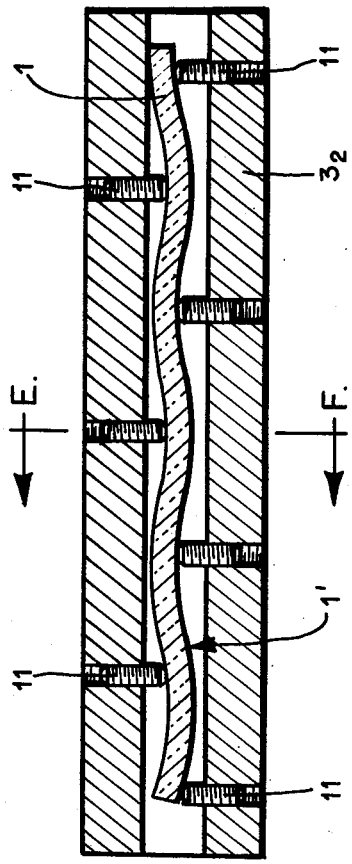
FIG. 6 is a sectional view of a fourth preferred embodiment of the invention.

In FIG. 6 the measuring scale 1 is a glass rod which is fastened exclusively between adjustment screws 11 which engage laterally at the top and bottom sides of the glass rod. The grid graduation is located outside the neutral plane of the scale body at the surface 1'. Its graduation becomes longer and/or shorter by elongation and compression of the marginal zones of the glass body 1. In measuring systems where the scanning unit is not seated on the measuring graduation, as in FIG. 6, the correction attainable by bending of the measuring graduation perpendicular to the graduation plane is a function of the thickness of the scale as well as the sagging of the scale.

Of course, it should be understood that various changes and modifications to the preferred embodiments described herein will be apparent to those skilled in the art. For example, the invention is not restricted to use with the photoelectric measuring systems shown, but can be used in an analogous way with any longitudinal or angular measuring system having a measuring graduation. Such changes and modifications can be made without departing from the scope of the present invention and without diminishing its attendant advantages. It is, therefore, intended that such changes and modifications be covered by the following claims.

I claim:

1. In a measuring device including a measuring scale having spaced graduations and a scanning unit movable along the scale, an error correction apparatus comprising:

means for deflecting the measuring scale at one or more points along the scale such that the graduations do not lie in a single plane, said deflecting means operating to alter the effective spacing of the graduations to accomplish the error correction.

2. The apparatus of claim 1 wherein the deflecting means includes at least one adjustment member positioned to contact the scale for deflecting the scale.

3. The apparatus of claim 2 wherein the measuring device includes a support member, the measuring scale is fastened to the support member by means of a highly elastic layer, and the adjustment member is positioned to deflect the scale away from the support member.

4. The apparatus of claim 2 wherein the measuring device includes a support member, the measuring scale is fastened to the support member by means of a highly elastic layer, and the adjustment member is positioned to deflect the scale toward the support member.

5. The apparatus of claim 4 wherein the highly elastic layer is positioned only at the terminal areas of the scale.

6. The apparatus of claim 1 wherein the deflecting means includes a first set of adjustment members positioned to contact an upper face of the scale and a second set of adjustment members positioned to contact a lower face of the scale and the first and second adjustment members cooperate to deflect the measuring scale.

7. The apparatus of claim 1 wherein the measuring scale is a flexible tape and the deflecting means includes a plurality of adjustment members positioned to deflect the scale at a plurality of points.

8. The apparatus of claim 1 or 2 or 6 or 7 wherein the measuring device further includes a support member for supporting the measuring scale and the adjustment members are mounted in the support member.

9. The apparatus of claims 3 or 4 or 5 wherein the adjustment members are mounted in the support member.

10. The apparatus of claims 1 or 2 or 3 or 4 or 5 or 6 or 7 wherein the measuring device further includes a housing surrounding the scale for protecting the scale from environmental influences and the adjustment members are mounted in the housing.

11. The apparatus of claim 1 wherein the deflecting means compensates for non-linear errors and the apparatus further includes means for altering the length of the measuring scale to compensate for linear errors.

12. The apparatus of claim 1 wherein the scanning unit is mounted in an articulated manner to a movable member and is arranged to be guided on the measuring scale.

* * * * *

UNITED STATES PATENT AND TRADEMARK OFFICE
CERTIFICATE OF CORRECTION

PATENT NO. : 4,170,829

DATED : October 16, 1979

INVENTOR(S) : Gunther Nelle

It is certified that error appears in the above-identified patent and that said Letters Patent are hereby corrected as shown below:

Column 3, line 12, delete "1''" and insert therefor --1'--;

Column 3, line 16, delete "disburbing" and insert therefor --disturbing--.

Signed and Sealed this

Fifteenth Day of April 1980

[SEAL]

Attest:

SIDNEY A. DIAMOND

Attesting Officer

Commissioner of Patents and Trademarks